Oct. 6, 1970  G. C. VINES ET AL  3,531,925

FRUIT HARVESTER

Filed Nov. 14, 1966  5 Sheets-Sheet 1

INVENTORS
GERAN C. VINES
CLAYTON L. VINES
BY
R. E. Geangue
ATTORNEY

United States Patent Office 3,531,925
Patented Oct. 6, 1970

3,531,925
FRUIT HARVESTER
Geran C. Vines and Clayton L. Vines, Santa Barbara, Calif., assignors to Air-O-Matic Fruit Harvesting Co., Kingsburg, Calif., a corporation of California
Filed Nov. 14, 1966, Ser. No. 593,856
Int. Cl. A01g *19/06*
U.S. Cl. 56—329                            8 Claims

ABSTRACT OF THE DISCLOSURE

The fruit harvester is used in connection with a tree shaker for collecting fruit shaken from the tree. A harvester platform moves downwardly and in toward the tree trunk from a stationary frame until its leading edge is positioned underneath the tree. In such position the leading edge is located close to the ground and the platform slopes upwardly to minimize the vertical distance from the tree branches outwardly along the branches. A plurality of tilted, resilient shock pads extend lengthwise of the platform with their edges overlapping. Each pad has a resilient core which is encased in an outer flexible, pliable envelope. The pads direct the fruit onto a solid platform on which the fruit moves to a pair of conveyors along the platform leading edge and these conveyors connect with other conveyors which transport the fruit to the collection container. Wheels are located at each end of the stationary frame which can be rotated independently of each other to provide for movement of the fruit harvester in confined space.

---

This invention relates generally to harvesting machines. More particularly, the invention relates to a fruit harvester to be used in conjunction with a tree shaker for shaking fruit from a tree onto the harvester.

As will appear from the ensuing description, the present harvester may be used for harvesting a variety of tree-grown fruit. However, the harvester is intended primarily for and will be described in connection with the harvesting of deciduous fruit.

One of the current methods of harvesting deciduous fruits involves the conjoint use of a tree shaker for vibrating or shaking a tree in such a way as to break the fruit loose from the tree branches and a harvester which is positioned below the tree to catch the falling fruit. A typical harvester for this purpose comprises a vehicle mounting resilient fruit arresting means, such as resilient catch or shock pads, for arresting the falling fruit without damage. The pads may be inclined to direct the fruit to a conveyor which then transports the fruit to a central collection point or receiver on the vehicle.

The existing fruit harvesters of this kind have certain inherent deficiencies which the present invention seeks to overcome. One of these deficiencies resides in the fact that their shock pads commonly comprise inflated air bags. These air bags are difficult to maintain at the proper pressure with the result that the harvesters are frequently used with improper inflation pressure in the bags. Such improper indation pressure may cause improper operation of the bags. Thus, excessive inflation pressure may result in excessive rebound of the falling fruit, often to such an extent that the fruit is propelled onto the ground, or at least, out of the intended flow path of the fruit through the harvester. Underinflation of the air bags, on the other hand, may impede proper rolling movement of the fruit from the bags with the result that the fruit may collect on the bags or roll too slowly from the bags. In either case, the fruit on the air bags is exposed to impact by fruit falling from the tree. Such impact may damage the fruit and render it unusable. Moreover, the air bags tend to acquire leaks and otherwise deteriorate with use. Accordingly, the bags require frequent repair and replacement.

Another deficiency of the existing fruit harvesters of the kind under discussion resides in the fact that they are difficult to maneuver into the correct position to catch fruit falling from a tree. This is due, in part, to the fact that their fruit arresting means cannot be adjusted or positioned with respect to the harvester vehicle. As a consequence, the fruit arresting means must be positioned relative to each tree solely by maneuvering of the harvester vehicle itself. Positioning the entire harvester vehicle relative to each tree in this way is obviously tedious, time consuming and difficult. Moreover, it precludes simple, essentially linear movement of the vehicle along a row of trees, from one tree to the next, thus further increasing the harvesting time and difficulty. In addition, the steering system of many harvesting vehicles resembles that of the conventional automotive vehicle. Accordingly, the maneuvering freedom of these harvesting vehicles is severely restricted. This, in turn, complicates and prolongs the task of locating the harvester in proper harvesting relation to each fruit tree. The maneuvering problems discussed above are compounded, of course, by the confined maneuvering space which is available in most fruit orchards.

It is evident at this point, therefore, that there is a definite need for an improved fruit harvester of the kind under discussion. A principal object of this invention is to provide such an improved harvester.

A more specific object of the invention is to provide a fruit harvester having resilient fruit arresting shock pads of improved design.

A related object of the invention is to provide a fruit harvester of the character described wherein the shock pads require no air inflation, are not prone to deterioration, and eliminate the necessity of frequent periodic repair and replacement of the pads.

Another object of the invention is to provide a fruit harvester of the character described wherein the fruit arresting means may be laterally extended and retracted relative to the harvester vehicle, thus simplifying the task of locating the arresting means in proper harvesting relation to each fruit tree.

A related object of the invention is to provide a fruit harvester of the character described wherein the fruit arresting means may be extended and retracted relative to the harvester vehicle in such a way as to virtually eliminate maneuvering of the vehicle into position at each fruit tree, thus permitting the vehicle to follow a general linear path of movement, from one tree to the next, along a row of fruit trees.

Another related object of the invention is to provide a fruit havester which generally expedites, simplifies, and reduces the time involved in harvesting an orchard.

A further object of the invention is to provide a fruit harvester of the character described wherein the harvester vehicle has a unique steering system embodying ground wheels which are rotatable through 180° to permit vehicle movement in any direction, thus to accommodate travel of the vehicle through, and any required maneuvering of the vehicle within, the narrow corridors of a fruit orchard.

Yet a further object of the invention is to provide a fruit harvester of the character described which is relatively simple in construction, economical to manufacture, compact in size, and otherwise ideally suited to its intended purposes.

Other objects, advantages, and features of the invention will become readily evident as the description proceeds.

The invention will now be described in detail by reference to the attached drawings wherein:

FIG. 1a is a view looking down on a fruit tree and showing a pair of harvesters in harvesting position below the tree branches;

FIG. 9 is a view looking in the direction of arrows on line 9—9 in FIG. 7;

In general terms, the fruit harvester 20 which has been selected for illustration in the drawings comprises a vehicle 22 mounting ground wheels 24. Associated with these wheels are propulsion means 26 for driving the wheels, thus to propel the vehicle along ground. Mounted on the vehicle frame 27, for lateral movement relative to the vehicle, is a platform 28 supporting resilient fruit arresting means 20. The platform is driven in its relative lateral movement by platform drive means 32 on the vehicle.

Figure 1:
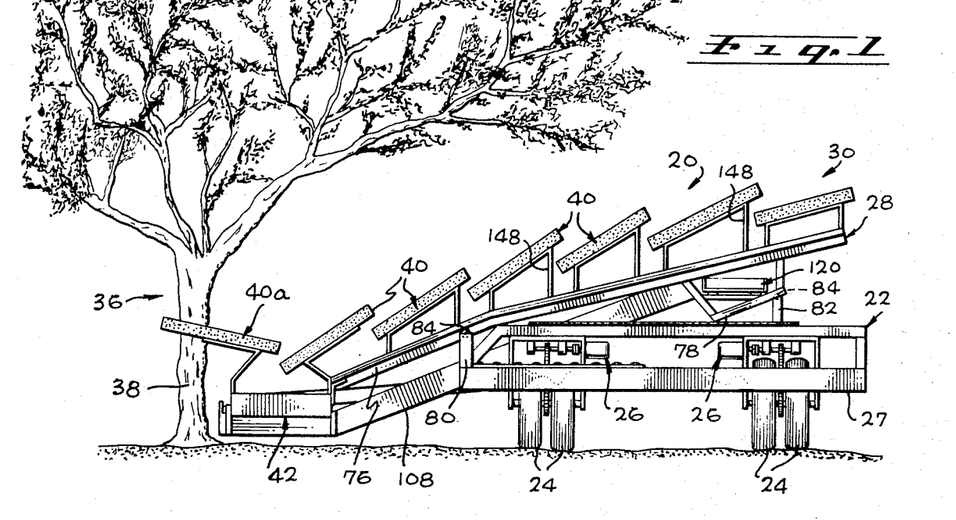
FIG. 1 is a side elevation of a fruit harvester according to the invention illustrating the fruit arresting means of the harvester extended into harvesting relation relative to a fruit tree.
Figure 2:
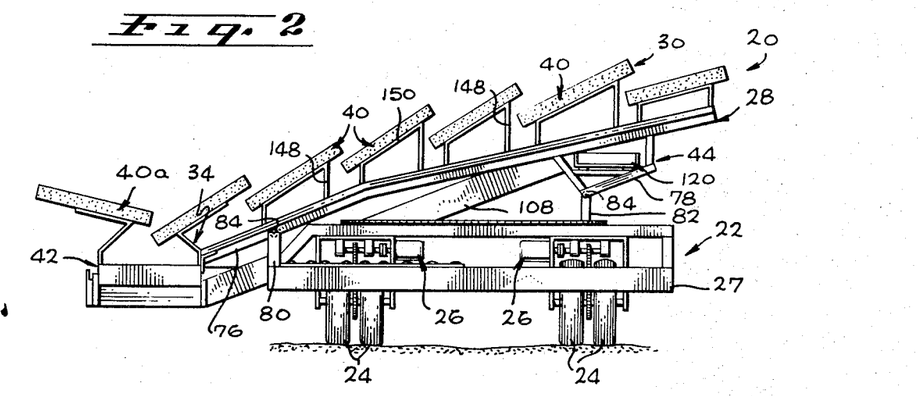
FIG. 2 is a side elevation of the harvester illustrating the fruit arresting means retracted to a position of travel relative to the harvester vehicle.

The harvester platform 28 is movable relative to the harvester vehicle 22 between its retracted position of travel, shown in FIG. 2, and its extended harvesting position, shown in FIG. 1. In its extended harvesting position, one side 34 of the platform projects a substantial distance beyond the adjacent side of the vehicle frame 27. When the platform is retracted, this latter platform side is located adjacent the vehicle frame, thus to provide the harvester with minimum overall width, compatible with movement of the harvester through the narrow corridors defined between adjacent rows of fruit trees in the average fruit orchard. Extension and retraction of the platform of the illustrated harvester occurs along a direction line which slopes downwardly in the direction of the extended position of the platform. Accordingly, the platform extends under the force of gravity and is retracted by operation of the platform drive means. As will appear from the ensuing description, however, the platform may extend and retract horizontally. In this case, means are provided for driving the platform in both its extension and retraction movement. For example, the platform may be extended by springs and retracted hydraulically or extended hydraulically and retracted by springs. Alternatively, the platform may be hydraulically extended and retracted.

Briefly, in use of the fruit harvester 20, the latter is driven along a row of fruit trees 36, from one tree to the next. At each tree, the harvester is stopped, and the harvester platform 28 is extended to harvesting position below the branches of the adjacent tree, as shown in FIGS. 1 and 1a. During this extension, the leading side 34 of the platform moves down and in toward the tree trunk 38. The slope of the direction line of relative platform movement is such that in its fully extended position, the leading platform side 34 is located close to the ground and below the lowermost tree branches. The platform slopes upwardly toward its opposite side in such a way that the elevation of the fruit arresting means 30 increases outwardly from the tree trunk, thereby to minimize the vertical distance between the arresting means and the tree branches, outwardly along the branches.

After the fruit harvester 20 is thus properly located in harvesting position, the fruit tree 36 is vibrated by means of a tree shaker S to break the fruit loose from the tree branches. The fruit drops from the branches onto the resilient fruit arresting means 30 of the harvester. In the particular harvester illustrated, these arresting means comprise a number of spaced, overlapping shock pads 40 which are uniquely constructed in accordance with the invention and inclined to absorb the energy of the falling fruit, without damage to the fruit, and direct the fruit toward the lower side 34 of the harvestor platform 28. Thus, the fruit rolls from the shock pads onto the platform and then rolls downwardly along the platform to conveyors 42 along the lower platform side 34. These conveyors form part of a conveyor system 44 on the harvester which transports the fruit to a central collection point 46 on the harvester. After the fruit has been harvested from the tree 36, the harvester platform 28 is retracted to complete the operating cycle of the harvester, after which the latter is moved to the next tree and the cycle is repeated.

In actual practice, a pair of the present harvesters 20 are employed to harvest the fruit from each fruit tree. As shown in FIG. 1a, these two harvesters are located at opposite sides of each tree in such a way that the fruit arresting means 30 on the two harvesters together encompass a major portion of the projected area of the tree branches.

Referring now in greater detail to the illustrated fruit harvester 20, the frame 27 of the harvester vehicle 22 comprises an open rectangular framework composed of rigid metal frame members which are welded or otherwise rigidly joined. Adjacent the ends of the frame 27 are transverse frame members 48 each supporting a pair of wheel assemblies 50. Each wheel assembly comprises a pair of the ground wheels 24 fixed to an axle 52. The ends of the axle are rotatably supported in the depending arms 54 of a wheel yoke 56. Rigid on and rising from the center of the upper cross member of the wheel yoke 56 is a journal 58 which extends through and is rotatably supported in the overlying frame member 48. A sprocket 60 is fixed to the upper end of the journal.

Trained about the two sprockets 60 at each end of the vehicle frame 27 is a sprocket chain 62 having a drive link 64 connected therein. This drive link is attached to the ram 66 of a hydraulic linear actuator 68 mounted on the adjacent frame member 48. It is evident that the pair of wheel assemblies 50 at each end of the frame 27 may be rotated in unison in either direction, to steer the harvester vehicle 22, by pressurizing one end or the other of the corresponding actuator cylinder. The two wheel assemblies of each assembly pair are rotatable through 180° and are oriented with their wheel axes parallel. The steering arrangement of the present harvester obviously permits movement of the harvester in any direction, i.e. fore and aft, laterally, diagonally, arcuately, by appropriate rotation of the two pairs of wheel assemblies individually or in union.

The illustrated wheel propulsion means 26 comprise a propulsion unit 70 for each wheel assembly 50. Each propulsion unit 70 includes a hydraulic motor 72 coupled by a sprocket chain drive 74 to the axle 52 of the respective wheel assembly. Thus, the two ground wheels 24 of each wheel assembly are driven by their respective propulsion motor 72. It is obvious that the ground wheels may be driven in other ways, as by hydraulic motors which are coupled to the wheels through gear boxes.

Figures 3, 12, 13, 14:
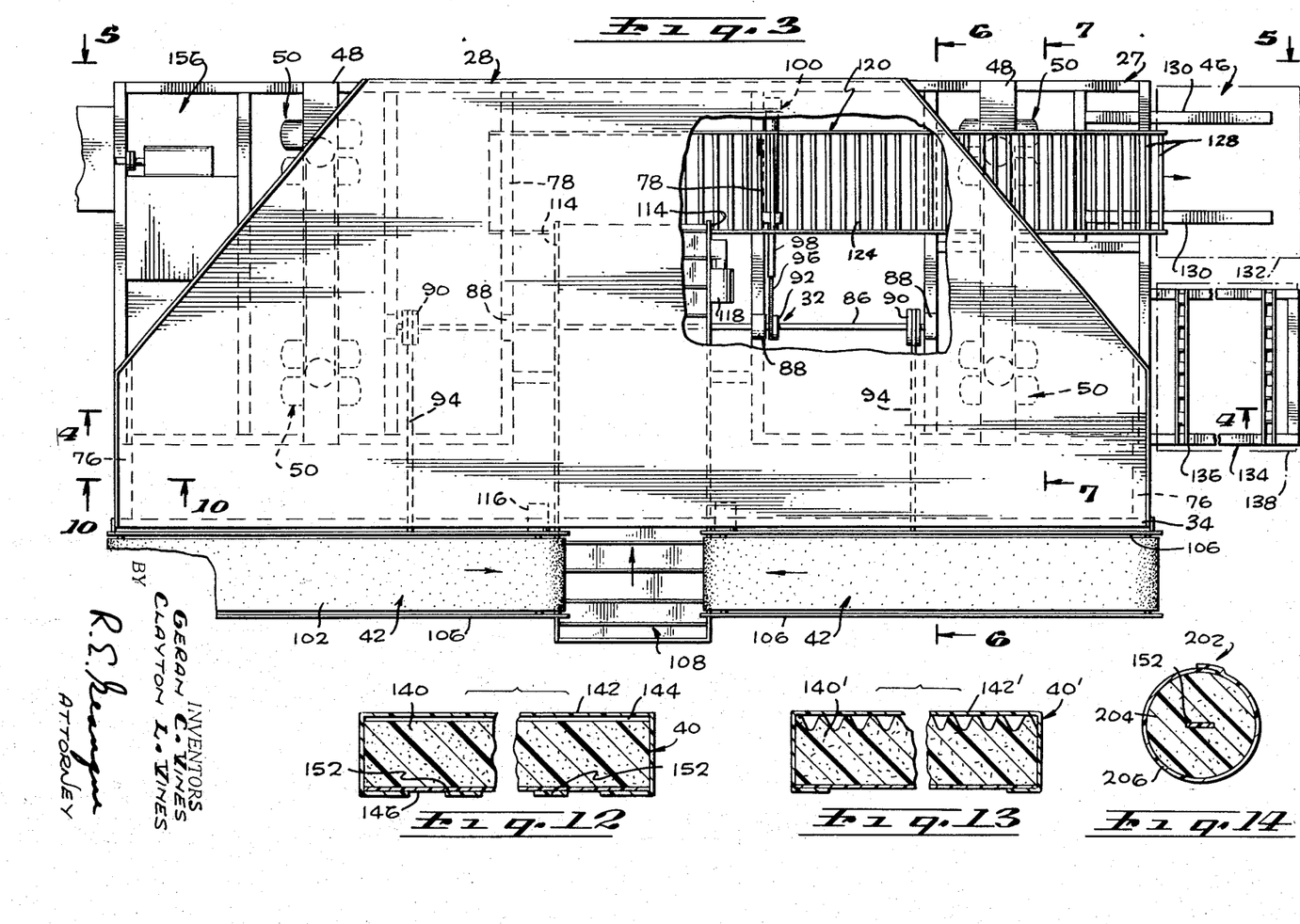
FIG. 3 is an enlarged top plan view of the harvester, with parts omitted and broken away for the sake of clarity.
FIG. 12 is an enlarged section through a fruit arresting shock pad embodied in the fruit harvester.
FIG. 13 is a section through a modified shock pad.
FIG. 14 is a section through further modified fruit arresting means.
Figure 4:
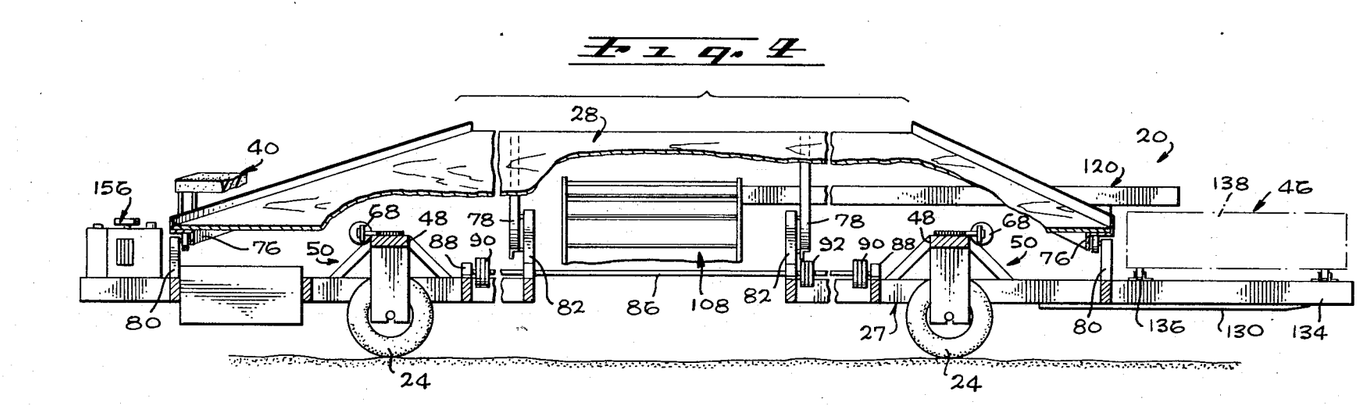
FIG. 4 is a section taken on line 4—4 in FIG. 3.
Figure 5:
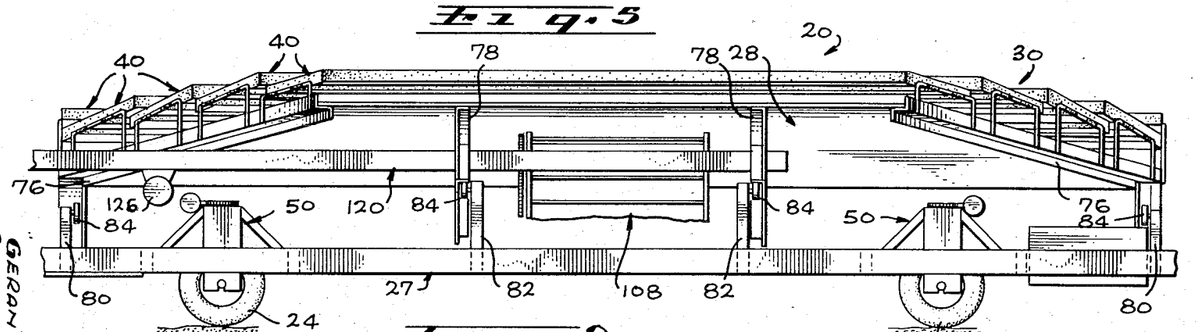
FIG. 5 is a side elevation of the harvester looking in the direction of the arrows on line 5—5 in FIG. 3.
Figure 6:
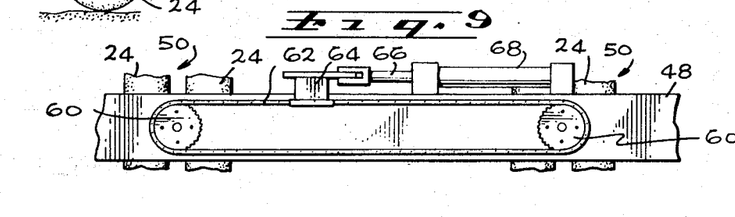
FIG. 6 is an enlarged section taken on line 6—6 in FIG. 3.
Figure 7:
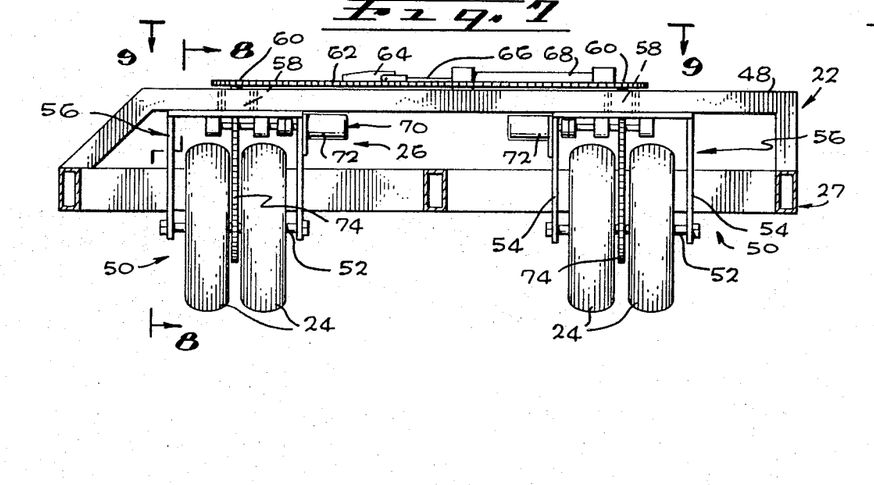
FIG. 7 is an enlarged section taken on line 7—7 in FIG. 3.
Figure 8:
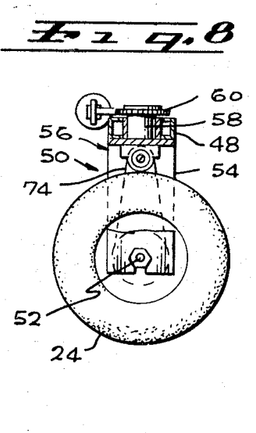
FIG. 8 is a section taken on line 8—8 in FIG. 7.
Figure 10:
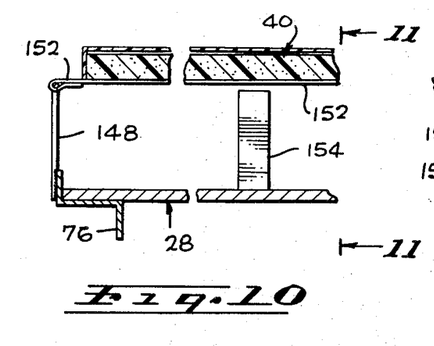
FIG. 10 is a section taken on line 10—10 in FIG. 3.
Figure 11:
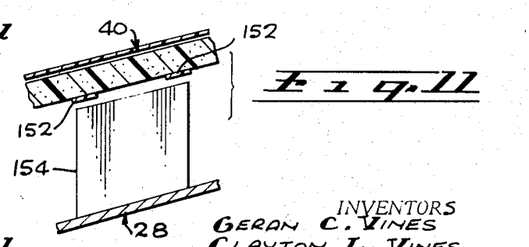
FIG. 11 is a section taken on line 11—10 in FIG. 10.

The harvester platform 28 may be constructed of wood or other suitable material and preferably has the generally tapered configuration, best illustrated in FIGS. 1a and 3. The lower side 34 of the platform will be observed to be its widest side. As shown best in FIG. 6, the platform 28 includes a lower portion 28a having a slightly greater gradient than the upper platform portion 28b. Fixed to the underside of the lower platform portion 28a, along the front and rear edges of this portion, relative to the fore and aft direction of the harvester, are a pair of parallel tracks 76. These tracks parallel the plane of the lower platform portion 28a. Fixed to the underside of the upper platform portion 28b are a second pair of tracks 78 which generally parallel the tracks 76. Tracks 78 are spaced from and are disposed in a common plane inclined at an acute angle to the upper platform portion 28b, as shown best in FIG. 6. Fixed to and rising from the ends of the vehicle frame 27, below the lower and upper platform portions 28a and 28b, respectively, are upstanding brackets 80 and 82. These brackets mount rollers 84 which rollably engage the tracks 76 and 78, respectively, thus to support the harvester platform 28 for its relative lateral movement with respect to the harvester vehicle 22. It is obvious that the tracks 76, 78, brackets 80, 82 and rollers 84 are effective to position the platform 28 at the illustrated slope and to support the platform for movement along a direction line which inclines downwardly in the direction of the extended position of the platform, as noted earlier. The platform is obviously urged toward its extended position by gravity.

The platform drive means 32 comprise a shaft 86 which extends lengthwise of the harvester vehicle frame 27, approximately along the longitudinal center line of the frame. This shaft is rotatably supported in bearings 88 on the frame. Fixed to the ends of the shaft 86 are drums 90. Fixed to the shaft between its ends is a center drum 92. Cables (or chains) 94 are wrapped about and fixed at one end to the end cable drums 90. The other ends of the cables 94 are attached to the lower side 34 of the platform 28. Wrapped about and fixed at one end to the center drum 92 is the cable 96. The opposite end of this latter cable is secured to the ram 98 of a hydraulic linear actuator 100 mounted on the harvester frame 27. The cables 94, 96 are wrapped about their respective drums in such a way that retraction of the actuator ram 98 into its cylinder rotates the cable drum shaft 86 in a direction to wind the cables 94 on their respective drums 90 and thereby drive the harvester platform 28 to its retracted position against the action of gravity. Extension of the actuator ram 98 from its cylinder permits the platform to extend under the force of gravity.

The conveyors 42 along the lower side 34 of the harvester platform 28 comprise endless conveyor belts 102 supported on rollers 104 rotatably mounted on the platform. Side walls 106 rise above the sides of these conveyor belts. As shown best in FIG. 3, the inner or adjacent ends of the conveyors 42 are spaced opposite sides of the transverse center line of the harvester platform 28. In addition to the conveyors 42, the harvester conveyor system 44 includes a conveyor 108 which extends along the latter platform center line and has one end located in the space between the adjacent ends of the conveyors 42. Conveyor 108 has an endless conveyor belt 110 supported on rollers 112 rotatably mounted on the platform 28. As shown best in FIG. 6, the end of the conveyor 108 between the adjacent ends of the conveyors 42 is located below and generally parallels the latter conveyors. The other end of the conveyor 108 extends upwardly below the harvester platform 28. The harvester vehicle frame 27 is shaped to clear the conveyor 108 which cuts across the plane of the frame, as shown. Rising from the sides of the upper end of the conveyor 108 are side walls 114.

The lower conveyors 42 are driven by hydraulic motors 116 in directions such that the upper runs of their conveyor belts 102 travel toward one another and thus toward the inverting lower end of the conveyor 108. Conveyor 108 is driven by a hydraulic motor 118 in a direction such that the upper run of the conveyor belt 110 travels toward the upper side of the harvester platform 28.

The upper end of the conveyor 108 discharges to a horizontal sizing conveyor 120 embodied in the conveyor system 44. This sizing conveyor comprises an endless conveyor device 124 which is driven by a motor 126 and includes spaced conveyor bars 128. Conveyor bars 128 are spaced to permit undersize fruit to drop between the adjacent bars. The larger fruit which does not drop between the conveyor bars is carried by the conveyor device 124 to the collection point 46.

Mounted on the harvester vehicle from 27, at this collection point, are a pair of fork arms 130 for supporting a receptacle 132 into which the fruit drops from the adjacent open end of the sizing conveyor trough 124. If desired, the harvester may be equipped with hydraulic elevating means for raising and lowering the forks 130. Mounted on the end of the frame adjacent and to one side of the receptacle supporting forks 130 is a standby platform 134 mounting roller bar 136 for supporting a standby receptacle 138. The roller bars 136 are located at about the same elevation as the forks 130 to permit the standby receptacle 138 to be moved from the platform 134 onto the forks 130 when the receptacle 132 currently supported on the forks becomes filled.

As noted earlier, the fruit arresting means 30 of the present fruit harvester 20 comprise a number of resilient shock pads 40. One of these pads is shown in enlarged transverse cross section in FIG. 12. The several pads are substantially identical, differing only in length. Accordingly, the following description of the pad shown in FIG. 12 will be understood to apply to all of the pads. As shown in FIG. 12, each shock pad comprises an inner resilient core 140 constructed of sponge rubber, foam plastic, or other suitable resilient material. Core 140 is encased in an outer flexible, pliable envelope 142 constructed of a vinyl plastic or other suitable material. The plastic envelope 142 has a slightly loose fit about the resilient core 140, thus to provide a small air space 144 between the core and envelope. This air space has been exaggerated in FIG. 12 for the sake of clarity. It will be understood, of course, that the upper wall of the envelope 142 may contact the upper surface of the core 140 at various positions. Bonded to the underside of the core 140 is a fabric backing 146 which may be constructed of canvas or other suitable material. The lower edges of the envelope 142 turn inwardly under the pad core 140 and are bonded to the core backing 146.

The several shock pads 40 extend lengthwise of the harvester 20 above the harvester platform 28. The pads are laterally spaced in the direction in which the platform slopes and are disposed in inclined overlapping relation, as shown. It will be observed that each catch pad slopes downwardly in the direction of the lower side 34 of the platform. The shock pads are graduated in length in such a way that the pads become progressively shorter toward the upper, narrow side of the platform 28. Each pad, therefore, has a length approximating the lengthwise dimension of the platform at the corresponding position of the pad on the platform.

Rising from the harvester platform 28, along its front and rear sides relative to the fore and aft direction of the harvester, are a number of spaced upright pad supports 148 which may comprise metal rods bent into the illustrated shapes. Each pad support 148 will be observed to have a cross bar 150 which slopes downwardly in the direction of the lower side 34 of the platform 28. The pad supports along one side of the platform are aligned with the corresponding supports along the opposite sides of the platform, whereby each support at one side of the platform and its corresponding support at the opposite side of the platform defines an aligned pair of supports. Extending between and secured to the cross bars 150 of each such pair of pad supports are two laterally spaced pad supporting strips or webs 152. These webs may comprise woven nylon, or the like. As shown in FIG. 12, each pair of webs 152 are adhesively bonded or otherwise joined to the fabric backing 146 of the corresponding catch pad 40. It is now obvious, therefore, that each shock pad 40 is supported in its illustrated inclined position on the underlying pad supporting webs 152.

As indicated earlier and clearly shown in the drawings, the several shock pads are laterally spaced along the harvester platform 28 in the direction in which the platform slopes. The pads are disposed in overlapping relation in such a way that the upper edge of each pad overlies the lower edge of the adjacent pad nearest the upper side of the platform. It will be observed that the pad nearest the lower side 34 of the platform extends over the lower conveyors 42.

Mounted on the outboard side of the conveyors 42, in the same way as the shock pads on the harvester platform 28, are a pair of outboard pads 40a. These outboard pads are identical in construction to the pads 40 and have their inner ends spaced to straddle the trunk 38 of a fruit tree 36 in the manner illustrated in FIGS. 1 and 1a, when the harvester platform 28 is extended to its harvesting position. It will be observed that the shock pads 40a slope toward the conveyors 42 and overlap the lower pad 40 on the platform 28.

The supporting webs 152 for the shock pads 40 on the harvester platform 28 may provide sufficient vertical support for these pads. Preferably, however, the platform mounts, below each pad, a number of upright backup supports 154. The upper surfaces of these supports parallel their respective overlying catch pads and are spaced a distance, on the order of 1 to 2 inches, from the under surfaces of the pads when the latter occupy their normal unloaded positions shown in the drawings. A number of these back up supports are spaced along each pad 40 and serve to prevent excessive downward deflection of the pads under the impact force of the falling fruit against the pads and the weight of the fruit supported on and rolling downwardly along the pads, during operation of the harvester.

FIG. 13 illustrates a modified resilient shock pad 40' which may be advantageously employed on the present fruit harvester in lieu of the shock pads 40 described above. The modified pad is substantially identical to the shock pad 40 and differs from the latter only in that the upper surface of the pad core 140' is dimpled, as shown in FIG. 13. This dimpled upper surface of the core comprises a number of generally uniformly spaced, resilient formations which engage and support the upper wall of the pad envelope 142'. It has been found that this modified shock pad construction produces superior arresting of the falling fruit striking the pad. This is believed due to the fact that the motion of the falling fruit is initially retarded by deflection of the spaced formations on the upper surface of the pad core and the damping action of the air spaces between the formations. Final arresting of the fruit occurs when the latter encounters the main body of the core. It has also been found to be advantageous, in some cases, to provide the pad core with a laminated construction, composed of a number of sponge rubber or foam plastic layers of progressively increasing density, and hence stiffness, toward the bottom of the core.

The several hydraulic motors and hydraulic linear actuators in the present fruit harvester are powered and controlled from an operator's control station 156 located at one end of the harvester frame 27. This control station is equipped with a hydraulic fluid reservoir, a pump for pumping hydraulic fluid under pressure from the reservoir to the various motors and actuators, and valves for controlling fluid flow from the pump to the motors and actuators. It will be understood, of course, that suitable hydraulic lines are provided for conveying the hydraulic fluid from the pump to the various motors and actuators and back to the reservoir.

The operation of the fruit harvester 20 is believed to be obvious from the foregoing description. Thus, the propulsion units 70 are powered to propel the harvester along a row of fruit trees and the steering actuators 68 are controlled to steer the vehicle. The harvester is stopped opposite each fruit tree, after which the platform actuator 100 is operated to effect extension of the harvester platform 28 to its harvesting position of FIG. 1 relative to the adjacent fruit tree 36. As noted earlier, during this extension of the platform, the latter moves downwardly and inwardly toward the tree trunk 38 to a position in which the lower outboard shock pads 40a on the platform straddle the trunk. The harvester wheel assemblies 50 may be rotated and powered to effect fore and aft, lateral, or arcuate movement of the harvester, as necessary to maneuver the fruit arresting means 30 of the harvester into harvesting position. As noted earlier, the present harvesters are used in pairs, the two harvesters being located at opposite sides of each tree to be harvested, as shown in FIG. 1a.

After the fruit harvesters 20 are thus maneuvered into harvesting position, a tree shaker is applied to the adjacent fruit tree 36 and is operated to vibrate the tree, thus to break the fruit loose from the tree branches. The falling fruit drops onto the shock pads 40, 40a of the underlying harvesters. Because of their resilient construction, the pads are effective to arrest the falling fruit without damage. The fruit rolls downwardly along the pads onto the harvester platforms 28 and then downwardly along the platforms onto the lower conveyors 42. These conveyors carry the fruit toward the intervening lower end of the harvester conveyors 108. The latter conveyors carry the fruit upwardly along the undersides of the platforms 28 to the conveyors 120 which permit the smaller fruit to drop through and the larger fruit to pass on to the receptacles 132. After the receptacles become filled, they are removed and replaced by the empty standby receptacles 138 currently on the standby platforms 134 of the harvesters.

After the fruit has been harvested from the tree, the platform actuator 100 of each harvester is operated to retract the harvester platform 28 to complete one operating cycle of the harvester. The harvesters are then driven to the next tree and the operating cycle is repeated.

It is obvious, at this point, that the maneuvering of the harvester necessary to locate its fruit catching means 30 in harvesting relation to each fruit tree 36 is substantially simplified owing to the fact that the harvester platform 28 can be extended and retracted relative to the harvester vehicle 22. Moreover, this ability of the platform to be extended and retracted minimizes or eliminates the need for maneuvering the vehicle itself at each tree. Accordingly, the harvester is permitted to follow a generally linear path of movement along a row of trees, from one tree to the next, without any appreciable maneuvering of the vehicle at each tree. It is significant to recall here that while the platform of the illustrated harvester moves along an incline in such manner that the platform extends under the force of gravity, the platform may move horizontally. In this case, the platform may be extended by springs and retracted hydraulically, retracted by springs and extended hydraulically, or both extended and retracted hydraulically. Another important advantage of the present harvester resides in the unique construction of the shock pads 40, 40a and 40'. Thus, it is evident that these pads do not require air inflation, are not prone to leakage, do not otherwise rapidly deteriorate with age, and are not subject to the other deficiencies, noted earlier, of the air bags which are conventionally used on fruit harvesters. Moreover, the present resilient shock pads have been found to produce a superior arresting action on the falling fruit without damage to or rebound of the fruit.

The modified fruit arresting means 200 in FIG. 14 comprise a number of cylindrical resilient shock pads 202 each having a cylindrical inner resilient core 204 surrounded by an outer pliable envelope 206. The core and envelope may be constructed of the same materials as the flat shock pads described earlier. The modified pads are supported by the webs 152 which extend centrally through the pad cores, as shown, and are secured at their ends to the pad supports 148. The pads 202 are spaced to retard the falling fruit and allow the latter to drop gently onto the underlying harvester platform 28.

It is now obvious, therefore, that the invention herein described and illustrated is fully capable of attaining the several objects and advantages preliminarily set forth.

While the instant invention has been shown and described herein what is conceived to be the most practical and preferred embodiment, it is recognized that departures may be made therefrom.

What is claimed is:

1. A fruit harvester to be used in conjunction with a tree shaker for shaking fruit from a fruit tree comprising:
   a vehicle including a frame;
   a platform mounted on said frame for lateral movement relative to said frame between an extended harvesting position wherein one side of said platform projects a distance beyond one side of said frame and a retracted position of travel wherein said platform side is located adjacent said frame side, whereby said vehicle is adapted to move along a row of fruit trees to be harvested to a position adjacent one side of each tree when said platform is retracted and said platform is adapted to be thereafter extended toward the adjacent tree to said harvesting position;
   means for extending and retracting said platform;
   resilient fruit arresting means on said platform;
   said platform and fruit arresting means being inclined to direct the falling fruit landing on said arresting means toward said one side of said platform; conveyor means on said platform including a conveyor along said one platform side for receiving fruit from said platform and conveying the fruit to a fruit collection point on said vehicle;
   said conveyor means further comprises a second conveyor extending upwardly below said platform and having one end located opposite one end of said first mentioned conveyor to receive fruit therefrom; and
   a third conveyor mounted under said platform for receiving fruit from the upper end of said second conveyor and conveying the fruit to said collection point.

2. A fruit harvester comprising:
   a vehicle;
   a platform mounted on said vehicle;
   a number of elongated laterally inclined resilient shock pads disposed in laterally spaced generally parallel overlapping relation over said platform;
   pad supporting means on said platform including flexible webs extending across said platform and secured to said pads, respectively, for supporting said pads in elevated positions over said platform; and
   backup supports mounted on said platform below and in spaced relation to said pads, respectively, for limiting downwardly deflection of said pads.

3. A fruit harvester to be used in conjunction with a tree shaker for shaking fruit from a fruit tree comprising:
   a vehicle including a frame and a platform;
   means for mounting said platform on said frame for lateral movement relative to said frame between an extended harvesting position wherein one side of said platform projects a distance beyond one side of said frame and a retracted position of travel wherein said platform side is located adjacent said frame side, whereby said vehicle is adapted to move along a row of fruit trees to be harvested to a position adjacent one side of each tree when said platform is retracted and said platform is adapted to be thereafter extended toward the adjacent tree to said harvesting position;
   means for extending and retracting said platform;
   resilient fruit arresting means mounted on said platform;
   said mounting means comprising guide means for moving said platform relative to said vehicle frame along a direction line which slopes downwardly in the direction of said harvesting position, and moving said one platform side downwardly and inwardly toward the trunk of the adjacent tree to a position below the lowermost tree branches when said platform is extended and said platform side outwardly and upwardly away from said tree trunk to an elevated position above the ground when said platform is retracted.

4. A fruit harvester according to claim 3 having means for mounting said fruit arresting means in fixed angular relationship to said platform, said fruit arresting means and said platform moving bodily at a fixed inclination relative to said frame along said direction line;
   the elevation of said fruit arresting means increasing in a direction away from said one platform side, thereby to minimize the vertical distance between said fruit arresting means and the tree branches at every position outwardly along said branches.

5. A fruit harvester according to claim 3 wherein:
   said platform and fruit arresting means are inclined to the vertical to direct the falling fruit landing on said arresting means toward said one side of said platform;
   said fruit arresting means comprises a number of sloping resilient shock pads mounted above said platform in overlapping relation in such manner as to retard falling fruit landing on said pads and direct the fruit onto said platform, whereby said fruit rolls along said platform toward said one side thereof; and
   conveyor means on said platform including a conveyor along said one platform side for receiving fruit from said platform and conveying the fruit to a fruit collection point.

6. A fruit harvester according to claim 3 having steerable ground wheel means mounted on said frames,
   said wheel means comprising a first pair of wheels spaced apart transversely at one location of said vehicle and a second pair of wheels spaced apart transversely at another location of said vehicle;
   each wheel of each pair being mounted for rotation about a vertical axis;
   first steering means for steering the wheels of said first pair in unison; and
   second steering means for steering the wheels of said second pair in unison and separately from said first pair;
   said wheel means permitting movement of said vehicle in any direction including fore and aft movement of the vehicle in a direction generally parallel to a row of trees and perpendicular movement of the vehicle transverse to said row and toward and away from an adjacent fruit tree.

7. A fruit harvester comprising:
   a vehicle;
   a platform mounted on said vehicle;
   a number of elongated laterally inclined resilient shock pads disposed in laterally spaced generally parallel overlapping relation over said platform so that fruit moving off the pads falls onto said platform;

each of said shock pads comprising an inner core constructed of a resilient foam material encased in an outer flexible, pliable envelope having a slightly loose fit about said core; and pad supporting means on said platform comprising flexible webs extending across said platform and secured to said pads, respectively, for supporting said pads in elevated positions over said platform.

8. A fruit harvester to be used in conjunction with a tree shaker for shaking fruit from a fruit tree comprising:

a vehicle including a frame;

a platform mounted on said frame for lateral movement relative to said frame between an extended harvesting position wherein one side of said platform projects a distance beyond one side of said frame and a retracted position of travel wherein said platform side is located adjacent said frame side, whereby said vehicle is adapted to move along a row of fruit trees to be harvested to a position adjacent one side of each tree when said platform is retracted and said platform is adapted to be thereafter extended toward the adjacent tree to said harvesting position;

means for extending and retracting said platform;

resilient fruit arresting means on said platform;

said fruit arresting means comprising a number of resilient shock pads extending transverse to the direction line of relative movement of said platform with respect to said vehicle frame and disposed in spaced overlapping relation along said direction line;

said platform extending underneath all of said pads;

each shock pad sloping downwardly in the direction of said one side of said platform for directing falling fruit landing on said pads toward said one platform side; and each of said shock pads comprising an inner core constructed of a resilient foam material encased in an outer flexible, pliable envelope having a slightly loose fit about said core.

References Cited

UNITED STATES PATENTS

| | | | |
|---|---|---|---|
| 2,436,648 | 2/1948 | Isom | 56—329 |
| 2,692,470 | 10/1954 | Boman | 56—328 |
| 3,027,967 | 4/1962 | Silver | 182—137 |
| 3,105,342 | 10/1963 | Hahn et al. | 56—328 |
| 3,250,065 | 5/1966 | Frost | 56—329 |
| 3,258,142 | 6/1966 | Girardi | 193—7 X |
| 2,763,331 | 9/1956 | Le Tourneau | 180—45 |
| 3,255,840 | 6/1966 | Tangen | 180—45 |
| 3,419,896 | 12/1968 | Duncan | 56—16 |
| 3,430,425 | 4/1969 | Pool et al. | 56—329 |

LOUIS G. MANCENE, Primary Examiner

J. A. OLIFF, Assistant Examiner